United States Patent [19]

Blicha

[11] 4,329,814
[45] May 18, 1982

[54] POTTED PLANT WATER PROTECTION TECHNIQUE

[76] Inventor: Michael A. Blicha, 11535 Kelowna St., Lake View Ter., Los Angeles, Calif. 91342

[21] Appl. No.: 128,178

[22] Filed: Mar. 7, 1980

[51] Int. Cl.³ ............................................. A01G 9/02
[52] U.S. Cl. ...................................................... 47/79
[58] Field of Search ................. 47/66, 71, 73, 79, 80, 47/81, 41, 41.11, 41.12, 41.2, 48.5, 66, 79; 137/590, 590.5, 593; 4/206, 255, 256, 257, 286, 287

[56] References Cited

U.S. PATENT DOCUMENTS

| | | | |
|---|---|---|---|
| 2,713,752 | 7/1955 | Sobol | 47/80 |
| 3,220,144 | 11/1965 | Green | 47/80 |
| 3,328,913 | 7/1967 | Yogt | 47/73 |
| 3,336,697 | 8/1967 | Davis | 47/41.12 |
| 3,432,027 | 3/1969 | Mueller | 47/73 X |
| 3,935,672 | 2/1976 | Chatelain | 47/66 X |
| 3,962,503 | 6/1976 | Crawford | 47/71 X |
| 3,973,316 | 8/1976 | Maher | 47/73 |
| 4,051,628 | 10/1977 | Knapp et al. | 47/48.5 |
| 4,077,159 | 3/1978 | Haglund | 47/66 |
| 4,160,342 | 7/1979 | Dryer | 47/80 |
| 4,173,097 | 11/1979 | Staby | 47/66 |

*Primary Examiner*—James R. Feyrer
*Attorney, Agent, or Firm*—Poms, Smith, Lande & Rose

[57] ABSTRACT

The present invention relates to protecting house plants from dying as a result of dehydration, when they are neglected, or when the householder is on vacation, for example. The invention involves an annular flange which is sealed to the inside bottom of a flower pot, and also includes a short upstanding conduit or pipe which is sealed to the flange around the flower pot drain hole. The flange may be of porous plastic for ease in cementing to the bottom of the flower pot, and the upstanding conduit may be either integral with and formed of the same material as the flange, or may be a separate short length of plastic tubing. In practice, when the plant is watered, a certain amount of water is trapped between the conduit and the sidewalls of the flower pot toward the bottom of the pot so that the entire soil within the pot stays moist for prolonged periods of time, thus providing good growing conditions for the plant.

1 Claim, 3 Drawing Figures

U.S. Patent        May 18, 1982        4,329,814
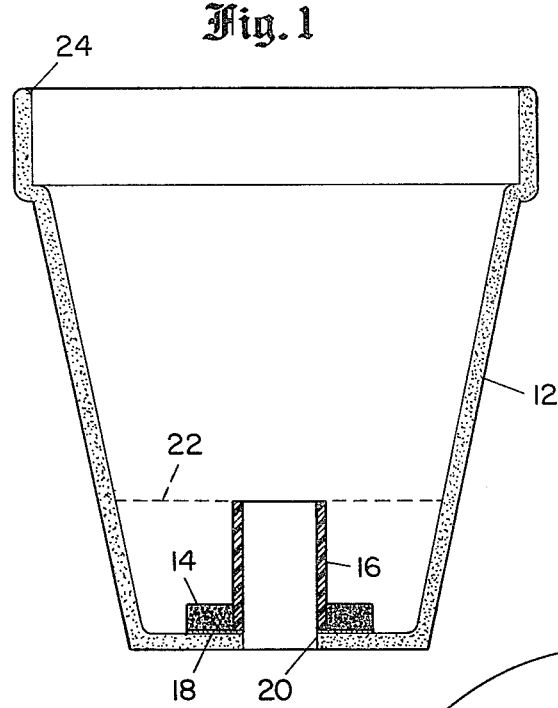
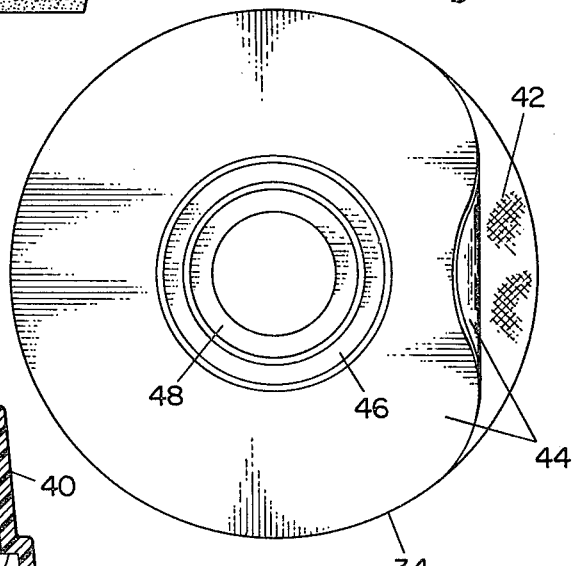
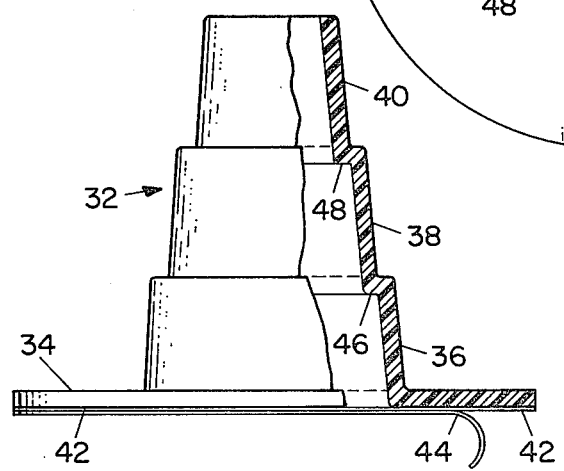

POTTED PLANT WATER PROTECTION TECHNIQUE

FIELD OF THE INVENTION

This invention relates to arrangements for prolonging the life and maintaining moist conditions for potted plants.

BACKGROUND OF THE INVENTION

It has previously been proposed to keep plants moist or under desirable growing conditions by various complex mechanical arrangements. Such arrangements are shown, for example, in U.S. Pat. No. 2,713,752, granted July 26, 1955; U.S. Pat. No. 3,220,144, granted Nov. 30, 1965; U.S. Pat. No. 4,077,159, granted Mar. 7, 1978; U.S. Pat. No. 4,160,342, granted July 10, 1979; and U.S. Pat. No. 4,173,097, granted Nov. 6, 1979. The arrangements shown in the foregoing patents are relatively complex mechanical structures, are specialized in nature, and would appear to be difficult and expensive to manufacture.

Accordingly, a principal object of the present invention is to provide an extremely simple and inexpensive device which may be employed with an ordinary flower pot to keep potted plants moist and protect them against drying out and subsequently dying out.

SUMMARY OF THE INVENTION

In accordance with the present invention, a simple device essentially consisting of an annular flange and a vertically extending conduit for sealing around the opening of a flower pot, is provided. The annular flange may be formed either integrally with, or formed separately from and secured to the vertical conduit. the annular flange is preferably porous plastic material for ease in cementing or otherwise securing to the inner bottom of the flower pot. The adhesive material may be in the form of pressure-sensitive adhesive material secured to the surface of the annular flange away from the conduit, and the pressure sensitive layer may be protected by a suitable removable film made of paper or a thin sheet of plastic.

It is to be understood that at least three inches of dirt or earth should be present in the flower pot above the upper end of the conduit. In this connection, in order to accommodate different size flower pots, different length upwardly extending tubes may be provided; or the upwardly extending material may be stepped or otherwise marked in order to indicate cutting points for reducing the length of the upwardly extending conduit for different depth flower pots. In addition, if desired, instead of using a pressure-sensitive adhesive, a small tube or other container for cement may be provided to secure the unit to the bottom of the flower pot.

In practice, it has been found that plants can survive for several weeks without watering with the use of the present invention, when they would clearly die in the absence of the special water reservoir provided as disclosed herein.

Other objects, features and advantages will become apparent from a consideration of the following detailed description and from the accompanying drawings.

BRIEF DESCRIPTION OF THE DRAWINGS

FIG. 1 is a cross-sectional view of a flower pot into which a protective water-saving device illustrating the principles of the invention has been cemented;

FIG. 2 is a cross-sectional view of an alternative embodiment of the invention using a molded foam plastic construction; and FIG. 3 is a bottom view of the alternative arrangement of FIG. 2.

DETAILED DESCRIPTION

Referring more particularly to the drawings, FIG. 1 shows a conventional flower pot 12 into which the water saving or plant protection unit including the flange 14 and the upwardly extending tubular extension 16 have been cemented by suitable waterproof adhesive material 18.

In the assembly shown in FIG. 1, both the flange 14 and the tube 16 are of circular configuration, with the flange 14 being of foamed porous plastic for ease in adhering to the bottom of the pot 12, and the tube 16 being of thin walled bendable plastic with a wall thickness in the order of 1/16th of an inch, and firmly bonded to the flange 14. The pot shown in FIG. 1 is of conventional construction, approximately 5½ inches tall, slightly more than six inches in diameter at its upper rim, about 3½ inches across the bottom, and provided with a lower opening 20 approximately ¾ths of an inch in diameter. The inner diameter of the conduit 16 is also approximately ¾ths of an inch in diameter. The vertical extent of the conduit 16 is in the order of two inches, to the dashed line 22, thereby leaving more than 3 inches between the line 22 and the upper rim 24 of the pot. This leaves 3 to 4 inches of soil which will not only drain properly but be maintained moist by contact with the initially saturated and wet soil below the dashed line 22. Thus, while it is recognized that roots extending below the dashed line 22 may not, in the case of a number of varieties of plants, grow properly in the supersaturated wet soil, there is adequate space maintained above the line 22 for adequate development and growth of the plant; and on balance, the resultant moisture which is saved by the unit 14, 16, will result in healthier and longer-lived plants, with the usual irregular care provided to the plants.

An alternative plant saver construction is shown in FIGS. 2 and 3, in which a molded foam plastic assembly 32 is provided with a lower flange 34, and a series of progressively reduced diameter upwardly extending conical extensions 36, 38 and 40. On the lower surface of the flange 34, away from the extensions 36, 38 and 40, are a layer of adhesive 42 and a protective peel-back layer of high strength paper or plastic material 44.

The dimensions of the unit of FIG. 2 include the outer diameter of the flange 34 which may be approximately two and three-sixteenths inches, the inner diameter which may be in the order of 29/32nds inch, the thickness of the flange 34 which may be in the order of 0.085 inch, and the height of the successive sections 36, 38 and 40 which may each be approximately ½ inch, The inner diameter of the upper edge of the top section 40 may be in the order of 21/64ths inch, its the outer dimension may be approximately ½ inch. The steps 46 and 48 are approximately ⅛ inch in radial extent. In addition, the walls of the successive sections 36, 38, and 40 are slightly angled for ease of clearance as the mold elements are separated. The unit 32 may be made of any suitable type of plastic material; for example, the styrofoam material of the type used in making hot drink cups may be employed. In some cases, however, it would be desirable to use somewhat higher strength plastic material. The pressure-sensitive adhesive material employed at 42 should be of a type which will make a firm and watertight bond with the inner bottom surface of the flower pot. Between the pressure-sensitive layer 42 and the peel-back layer 44 is the usual parting coating employed as is well known in the art to facilitate the removal of the peel-back layer prior to the unit being cemented in place.

In order to accommodate different size pots, the unit as shown in FIG. 2 may be cut to remove the upper section 40, or the second section 38, or any portions thereof. As mentioned above, it is normally desirable to have in the order of three or more inches of soil or earth in the flower pot above the top of the upwardly extending drainage conduit. Accordingly, when smaller pots are employed, a larger portion of the unit would be cut off; however, with large size pots, such as that described above in connection with FIG. 1, or larger pots, the entire unit may be employed intact.

In conclusion, it is to be understood that the foregoing description is merely illustrative of the principles of the present invention, and that other arrangements may be employed without departing from the spirit and scope of the invention. Thus by way of example, instead of the stepped unit shown in FIG. 2, a continuously extending conical unit could be employed. Further, if desired, the vertically extending conduit could be partially reduced in thickness, thereby marking the unit along its vertical extent, to facilitate the reduction in height, instead of using the stepped construction as shown in FIG. 2. Accordingly, the invention is not limited precisely to that shown in the drawings and as described hereinabove.

What is claimed is:

1. A universal plant protection unit for assuring water supply to a conventional flower pot having a central bottom opening comprising;
    a flat annular plastic member forming an outwardly extending flange of at least twice the area of said central opening for securing said protection unit to the bottom of a flower pot around the drainage hole of the pot;
    a hollow tubular extension secured to the inner edge of said annular member and extending generally perpendicularly from said annular member;
    an adhesive applied to the entire bottom surface of said flange for sealing said annular member to the bottom of the flower pot to the extent of said bottom surface, with the tubular extension extending upward into the pot, whereby a reservoir of water and damp earth which does not drain is maintained around the periphery of the bottom of said pot;
    said tubular extension being open at the top and having a reduced diameter at the top as compared to its diameter at the bottom where it is joined to said flange, and means provided for shortening the tubular extension at preselected levels, whereby said tubular extension may be readily cut off for use with flower pots of different sizes;
    said unit being a single molded plastic part including both the flat annular plastic member and also the tubular extension; and
    said unit being made of foamed plastic material.

* * * * *